(12) United States Patent
Monti

(10) Patent No.: US 8,528,726 B2
(45) Date of Patent: Sep. 10, 2013

(54) CONVEYOR FOR TRANSFERRING ARTICLES

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 329 days.

(21) Appl. No.: 13/040,416

(22) Filed: Mar. 4, 2011

(65) Prior Publication Data

US 2011/0220465 A1  Sep. 15, 2011

(30) Foreign Application Priority Data

Mar. 9, 2010 (IT) .............................. BO2010A0136

(51) Int. Cl.
*B65G 15/44* (2006.01)

(52) U.S. Cl.
CPC .................................... *B65G 15/44* (2013.01)
USPC ....................................................... 198/698

(58) Field of Classification Search
USPC ............................ 198/690.2, 698, 699, 731
See application file for complete search history.

(56) References Cited

U.S. PATENT DOCUMENTS

| 2,743,829 | A | * | 5/1956 | Ballard | 414/528 |
| 4,697,693 | A | * | 10/1987 | Rajala et al. | 198/699 |
| 5,135,644 | A | * | 8/1992 | Susse | 209/225 |
| 6,142,290 | A | * | 11/2000 | Tagliaferri | 198/716 |

FOREIGN PATENT DOCUMENTS

| DE | 3246528 A | 6/1984 |
| DE | 3338792 A | 5/1985 |
| DE | 102007049839 B3 | 6/2009 |
| GB | 2369338 A | 5/2002 |
| NL | 7802052 A | 6/1979 |

OTHER PUBLICATIONS

International Search Report for corresponding EP patent application No. EP 11 15 6852, Completed May 16, 2011, 2 pages.

* cited by examiner

*Primary Examiner* — Timothy Waggoner
*Assistant Examiner* — William R Harp
(74) *Attorney, Agent, or Firm* — William J. Sapone; Ware Fressola; Maguire & Barber LLP

(57) ABSTRACT

A conveyor for transferring articles, comprising: a cogged belt (1) provided with a first surface (10) exhibiting a cogging (D) for ring-winding on corresponding activating pulleys, and a second surface (11) opposite said first surface (10); at least an abutting element (2) fixable to said belt (1) for abutting an article and transferring the article following activation of the belt (1) by the pulleys: The belt (1) exhibits a housing (3) in said second surface (11) and the abutting element (2) exhibits a base (28) which is provided with a portion (29) conformed such as to be insertable and positionable in the housing (3) in order to enable fastening thereof to the belt (1).

5 Claims, 2 Drawing Sheets

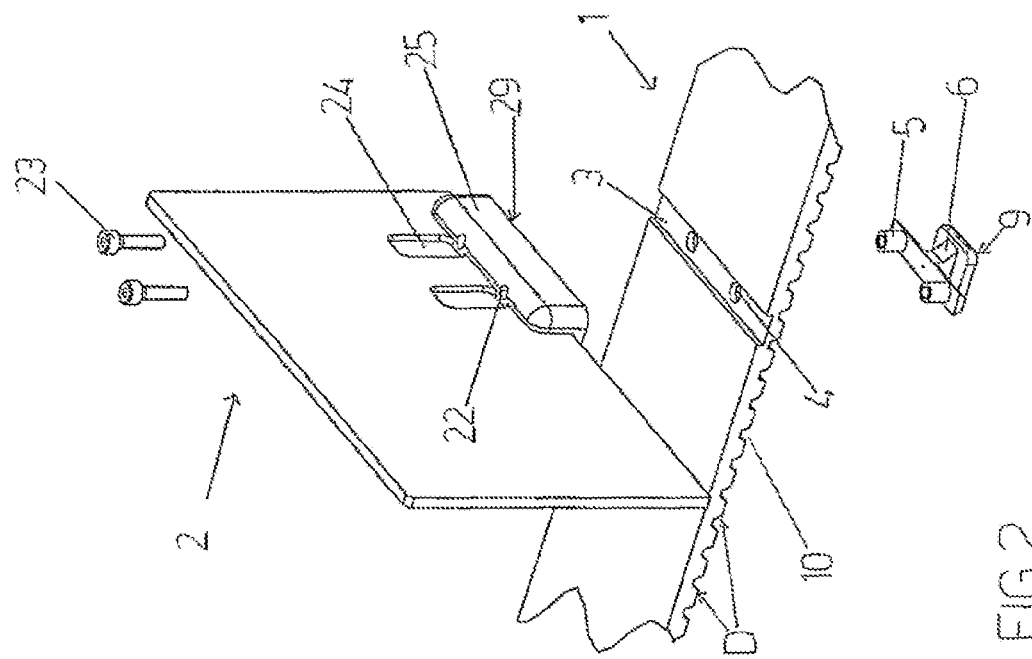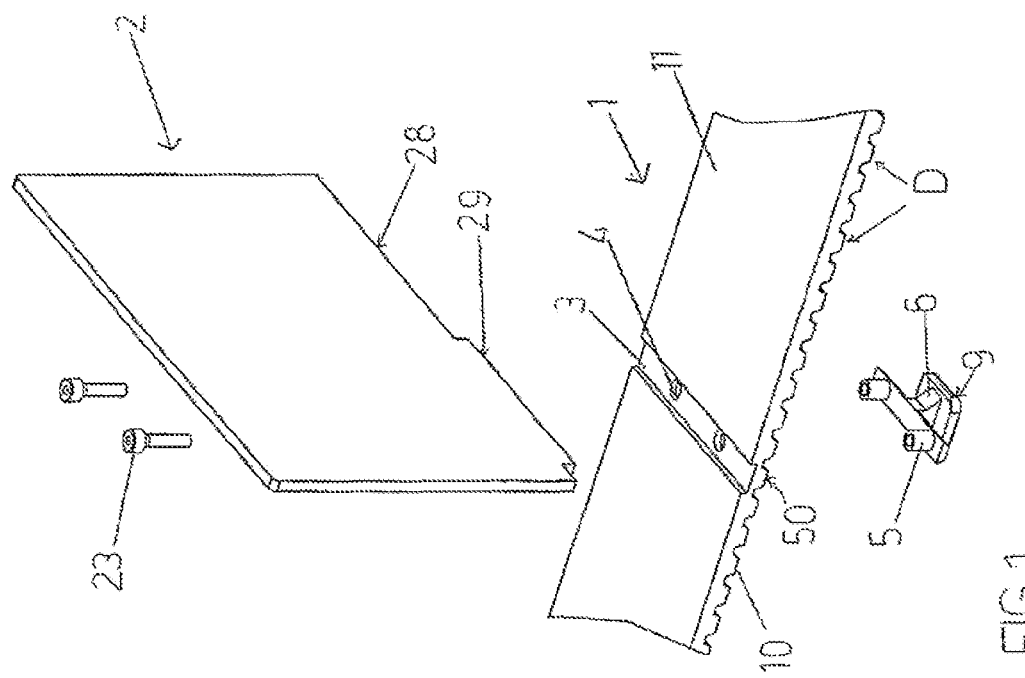

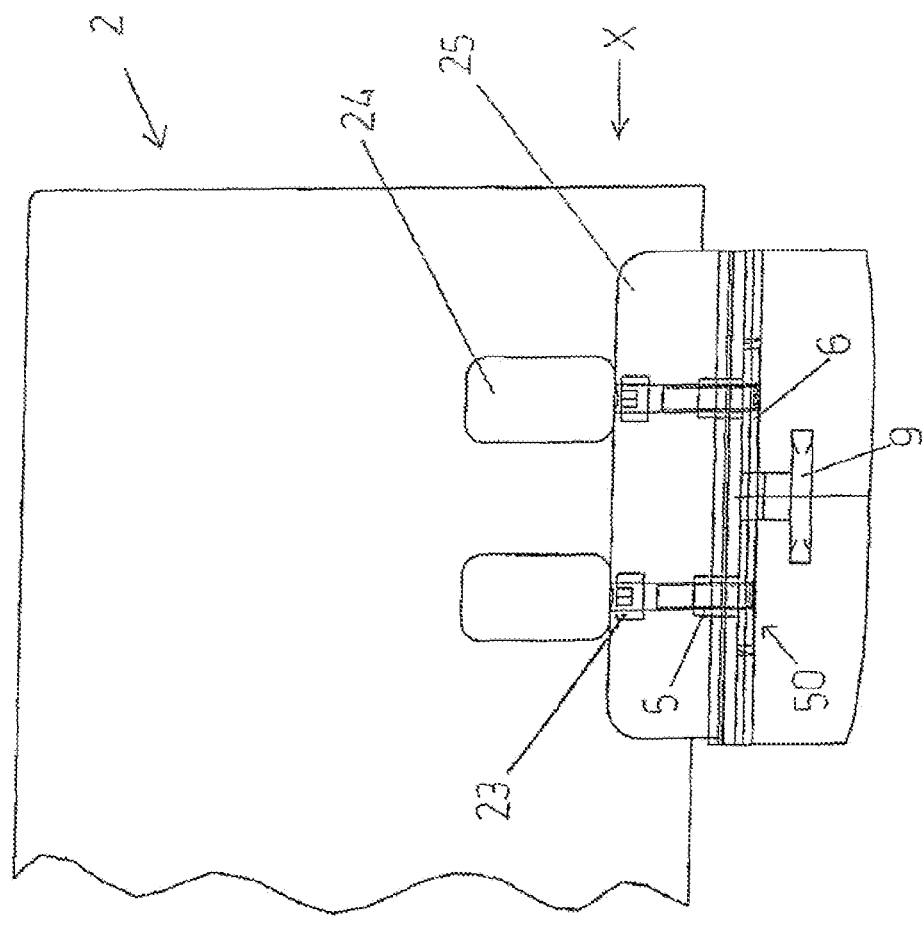
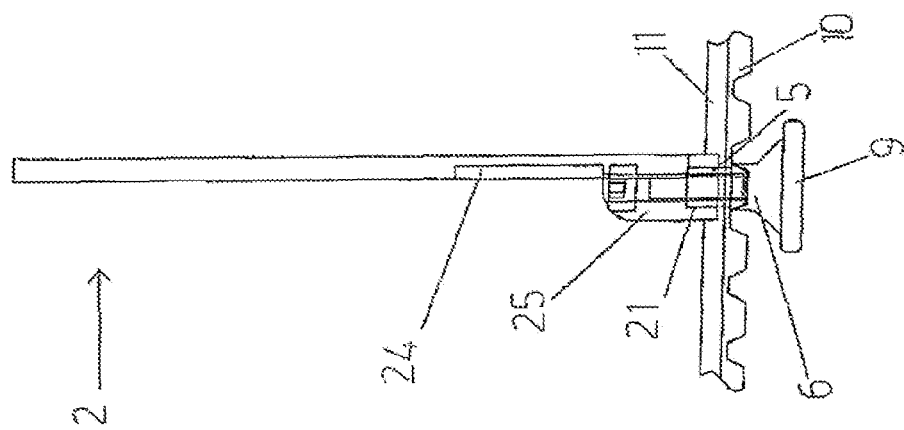

CONVEYOR FOR TRANSFERRING ARTICLES

FIELD OF THE INVENTION

The present invention relates to the technical sector of conveyors for transferring articles, for example cases or cartons.

In particular, the present invention relates to a conveyor for performing transfer of articles comprising a cogged belt and at least an element fixable thereto for abutting and drawing the articles.

As is known, a cogged belt constitutes, by its looped conformation, a closed ring wound on relative pulleys.

DESCRIPTION OF THE PRIOR ART

The use of cogged-belt conveyors for transferring articles is particularly widespread in the industrial field, for example for automatic packing of articles, which require being moved from a work station to a next.

For example, the conveyors are often used in a configuration which comprises flanking two cogged belts, arranged parallel and adjacent to one another. The relative abutting elements are dimensioned such as to project laterally, both occupying the surface of the belt adjacent to the belt they are fixed on. In this way, the abutting element define, on the surface of the two belts, a housing in which the articles are located, having a greater width than the width of a single cogged belt. The simultaneous start-up of the two belts thus enables the abutting elements to contact and subsequently draw the articles, pushing them during the conveying. In particular, the abutting elements of the first belt push the case along the conveying direction, while the abutting elements of the second belt stabilize the position during the transfer.

A further known configuration uses a single cogged belt, flanked to a sliding plane, usually horizontal, along which the articles to be transferred are positioned. The abutting elements are specially distanced from one another along the development direction of the belt, in order to enable positioning of the articles to be transferred. In this case too, the abutting elements project laterally beyond the belt, from the side of the plane, such as to abut and draw the articles, once the belt has been started up by the pulleys.

In the above-described conveyors, to perform transfer of the articles, the abutting elements are coupled to the cogged belt in such a way as to be positioned with a part of the base thereof resting on the surface of the belt opposite the side bearing the cogs, then to be fixed thereto.

For this purpose, the above-mentioned abutting elements exhibit the seatings in the part of the base which is rested on the surface of the belt and in contact there-with, while the cogged belt exhibits, in turn, through-holes, distanced such as to be facing and coaxial with the seatings of the abutting element, when the abutting element is positioned with the part of the base thereof resting on the belt.

To enable reciprocal blocking, a coupling element can be inserted in the cogged surface of the belt at the position of the holes, such as for example a cog-like element, bearing two prominences. The prominences are conformed such as to engage the through-holes, to project from the surface of the belt opposite the cogged side, and to occupy the seatings of the abutting element, thus fixing it to the cogged belt. In order to enable insertion of the cog-like element, the cogged surface of the belt, at the relative through-holes, is lacking a cog.

However, the above-described conveyor exhibits some drawbacks.

In a case in which the abutting elements are subject to accidental impacts on the contact surface with the articles, due to temporary malfunctioning, or in the case of very heavy articles being transported, they undergo stress forces which can cause them to flex with respect to the belt, and to change their alignment with respect thereto.

Over time, the stresses which cause the abutting elements to flex can have a negative effect on the coupling between them and the belt, creating a condition in which there is play, in particular between the prominences of the cog-like element and the through-holes of the belt and the seatings present in the base of the abutting elements receiving them. The onset of conditions allowing play in the coupling between the belt and the relative abutting elements compromises the alignment thereof with respect to the cogged belt, as well as the joint there-between.

Further, the fact that the abutting elements are resting on the surface of the belt, and exhibit dimensions such as to project laterally with respect thereto, facilitates the onset of play following the flexion to which they can be subject, due to the impacts and stress forces caused by the mass of the products to be transported.

Additionally, as these stress forces are repeated over time, the belt can be damaged, as can the abutting elements themselves: in these cases it will be necessary to replace the conveyor and the damaged abutting elements, an operation requiring time, with consequent negative repercussions on the functioning of the machines located upstream or downstream of the conveyor.

SUMMARY OF THE INVENTION

The aim of the present invention is to provide a conveyor for transferring articles which obviates the above-mentioned drawbacks.

In particular, the aim of the invention is to provide a conveyor in which a greater stability is guaranteed in the coupling between the belt and the abutting elements, preventing the onset of situations where there is play between them, and thus banishing the possibility of a deforming of the through-holes and damage to the cogged belt.

The above-mentioned aim is obtained with a conveyor for transferring articles according to the invention.

In accordance with the invention, the conveyor for transferring articles comprises:

a cogged belt provided with a first surface exhibiting a cogging for ring-winding on corresponding activating pulleys, and a second surface opposite said first surface; at least an abutting element fixable to said belt for abutting an article and transferring the article following activation of the belt by the pulleys; the conveyor being characterized in that the belt exhibits a housing in the second surface and in that the abutting element exhibits a base which is provided with a portion conformed such as to be insertable and positionable in said housing in order to enable fastening thereof to the belt.

The conveyor advantageously enables an increase in the stability of the coupling between the cogged belt and the abutting element, thus obviating the above-mentioned drawbacks. The greater stability is guaranteed by the fact that a portion of the base of the abutting element is inserted and positioned in a housing present in the belt, for reciprocal fastening and increasing the resistance to flexion.

The conveyor of the present invention can be destined, for example, for a use which comprises flanking two cogged belts arranged parallel and adjacent to one another, staggered such that the respective abutting elements define, on the surface of the two belts, a housing for the articles to be transported, as described herein above. The dimensions of the abutting elements of the two belts enable respectively contacting, drawing and positioning the articles, once the relative pulleys have been activated.

A further use comprises flanking the belt to a plane, usually horizontal, on which the articles to be transferred are arranged. In this case too, the abutting elements project beyond the belt, towards the plane, such as to contact the articles and transfer them.

Other advantageous characteristics of the conveyor of the invention are set out in the dependent claims.

BRIEF DESCRIPTION OF THE DRAWINGS

The characteristics of a preferred though not exclusive embodiment of the invention are described in the following, in accordance with what is set out in the claims and with the aid of the accompanying figures of the drawings, in which:

FIG. 1 is a perspective exploded view of the conveyor of the invention, from the front side of the abutting element, i.e. the side which abuts and draws the articles;

FIG. 2 is a perspective exploded view of the conveyor of the invention, from the rear side of the abutting element;

FIG. 3 illustrates, in a partial frontal view in section and in enlarged scale, the conveyor with the abutting element fixed to the belt;

FIG. 4 is a lateral view, according to the direction of the arrow X of FIG. 3, of the conveyor of the invention.

DESCRIPTION OF THE PREFERRED EMBODIMENTS

In the accompanying figures, the conveyor for transferring articles of the invention has been illustrated only partially and only at a significant part thereof, in relation to the present invention.

The conveyor comprises a cogged belt 1 which is provided with a first surface 10, in which a cogging D is fashioned.

The cogging D enables the belt to be ring-wound on corresponding activating pulleys (not illustrated).

The belt further comprises a second surface 11, opposite the first surface 10 bearing the cogging D.

The conveyor further comprises an element 2, for abutting the articles and transferring them, which can be fastened to the first cogged belt 1 in a special way which is described herein below. The abutting element 2 is dimensioned such as to laterally project with respect to the belt 1, once fixed thereto: in this way the abutting element can abut articles having a greater width than the width of the cogged belt 1 and transfer them following the action of the belt 1 by the pulleys (in one of the possible uses of the conveyor, as described above).

The details of the conveyor of the present invention with respect to conveyors in the prior art are as follows.

The belt 1 is provided on the second surface 11 thereof, opposite the first surface 10 with the cogging D, with a housing 3, while the abutting element 2 has a base 28 which is provided with a portion 29 conformed such as to be able to be inserted and positioned internally of the housing 3 for fixing the belt 1 (see FIGS. 1 and 2 for example).

The housing 3 and the portion 29 of the base 28 of the abutting element 2 exhibit reciprocal dimensions which are such that when the portion 29 is inserted in the housing it is perfectly complementary with the walls of the housing 3 and rests completely on the bottom thereof.

To realize the reciprocal fastening, the belt 1 exhibits through-holes 4 at the housing 3, while the portion 29 of the base 28 of the abutting element 2 affords seatings 21 (FIG. 4). The seatings 21 are conformed such as to be opposite to and coaxial with the through-holes 4 when the portion 29 of the base 28 of the abutting element 2 is inserted in the housing 3.

Once the abutting element 2 has been positioned with the portion 29 of the base 28 inserted internally of the housing 3 of the belt 1, special fastening means (5, 6) are insertable in the through-holes 4 from the side of the first surface 10 with the cogging D of the belt 1, and positionable in the seatings 21 of the portion 29 for blocking the abutting element 2 to the cogged belt 1.

In the special and preferred, though not exclusive, embodiment represented in the accompanying figures, the belt 1 of the conveyor is without a part of the cogging D thereof, in a determined region 50 of the first surface 10 situated at the housing 3 (FIG. 3). The lack of a part of the cogging (D) facilitates the insertion of the fastening means (5, 6) in the through-holes 4.

In this case (with a part of the cogging D missing), the fastening means 5, 6 comprise an element conformed as a cog-like element 6, bearing, on a side opposite the cogged profile, two tubular prominences 5.

The cog-like element 6 is conformed such as to be positionable in the region 50 of the first surface 11 (in which a part of the cogging D is missing), thus making up the missing part of the cogging D (see in particular FIG. 3).

The tubular prominences 5 exhibit dimensions that are such as to engage the through-holes 4 of the belt 1, to project from the housing 3 and from the second surface 11 and to insert in the seatings 21 of the portion 29 of the base 28 of the abutting element 2, in order to block the abutting element 2 to the belt 1.

Alternatively, in a variant, not illustrated, the fastening means 5, 6 can exhibit a different conformation, as long as they do not interfere with the seatings of the pulleys on which the belt 1 is wound, in which the cogs of the belt engage 1 for example, a single fastening means can be used which has two projections conformed such as to insert in the holes 4 of the belt 1 and in the seatings 21 of the portion 29 of the base 28.

In a particular and not exclusive embodiment, illustrated in the accompanying figures of the drawings, the portion 29 of the base 28 of the abutting element 2 exhibits through-holes 22 (visible for example in FIG. 2) which are externally accessible. The through-holes 22 are distanced such as to be coaxial, and communicating, with the seatings 21, and thus are also coaxial with the prominences 5 inserted in the through-holes 4 of the cogged belt 1 and in the seatings 21 of the portion 29 of the base 28 of the abutting elements 2.

In turn, the tubular prominences 5 are internally hollow and fastening elements 23 are further provided that are conformed and dimensioned such as to be insertable in the through-holes 22 and to be inserted engagingly internally of the prominences 5 in order to stabilize the fastening of the abutting element 2 to the belt 1.

In this way the stability of the conveyor is further increased. The insertion of the fastening elements 23 increases the stability of the coupling between the prominences 5 of the element conformed as a cog-like element 6 and the seatings 21 present in the portion 29 of the base 28 of the abutting element; consequently the resistance to flexion stresses, to which the abutting element 2 can be subject during the functioning of the conveyor, is increased.

Then, for example, the tubular prominences 5 can be internally threaded and the fastening elements 23, which cross the through-holes 22, can be constituted by screws.

Alternatively, a joint-coupling can be provided between the tubular prominences 5 and the fastening elements 23, inserted in the through-holes 22.

In the preferred embodiment of the invention, illustrated in the accompanying figures of the drawings, the portion 29 of the base 28 of the abutting element 2 is conformed such as to be projecting inferiorly from the base 28.

In particular, the portion 29 of the base 28 exhibits a broadening 25 which is dimensioned such as to at least partially interest the rear surface of the abutting element 2, opposite the front abutting surface of the articles (FIGS. 2, 4).

The broadening 25 advantageously has a reinforcing function and guarantees solidity to the conveyor. The broadening 25 actually increases the resistance to the flexion of the abutting element 2 in a case of an accidental impact or a malfunctioning of the conveyor. Thus the stresses which can be transmitted to the coupling elements (prominences 5, through-holes 4, seatings 22) between the cogged belt 1 and the abutting element 2 are also reduced.

The broadening 25, in which the through-holes 22 are afforded, further enables optimal insertion of the fastening elements 23.

In this regard, the abutting element 2 can exhibit, in the rear surface thereof, two recesses 24 facing the through-holes 22 (FIGS. 2, 3, 4).

The recesses 24 facilitate insertion of the fastening elements 23 internally of the through-holes 22 of the broadening 25, and are specially dimensioned for enabling this operation. In the embodiment described in the accompanying figures of the drawings, the cog-like element 6 can inferiorly exhibit a sliding skate 9, solidly constrained thereto (FIGS. 1-4).

When the cog-like element 6 is in the lower branch of the cogged belt 1, the sliding skate 9 inserts in a special guide (not illustrated), preventing the lower branch from curving due to the weight of the abutting element 2.

The presence of the sliding skate 9 therefore advantageously prevents excessive stress on the belt 1 due to the weight of the abutting element 2, when the abutting element 2 is in the lower branch.

The foregoing has been described by way of non-limiting example, and any eventual constructional variants are understood to fall within the ambit of protection of the present technical solution, as claimed herein below.

The invention claimed is:

1. A conveyor for transferring articles, comprising:
 a cogged belt (1) provided with a first surface (10) exhibiting a cogging (D) for ring-winding on corresponding activating pulleys, and a second surface (11) opposite said first surface (10);
 at least one abutting element (2) fixable to said belt (1) for abutting an article and transferring the article following activation of the belt (1) by the pulleys;
 wherein the belt (1) exhibits a housing (3) in said second surface (11) and wherein said abutting element (2) exhibits a base (28) which is provided with a portion (29) conformed such as to be insertable and positionable in said housing (3) in order to enable fastening thereof to the belt (1);
 wherein the belt (1) exhibits at least a through-hole (4) at the housing (3) and wherein said portion (29) of the base (28) of the abutting element (2) affords at least a seating (21) in such a position that when inserted and positioned in the housing (3) said seating (21) is facing and coaxial to said through-hole (4) and further comprising a fastener (5, 6), insertable through the through-hole (4) and positionable in the seating (21) for fastening the abutting element (2) to the belt (1);
 wherein the belt (1) is missing a part of the cogging (D) thereof in a region (50) of the first surface (10) thereof, situated at the housing (3), and wherein the fastener (5, 6) consist of an element (6) conformed as a cog-like element (6) bearing at least a tubular prominence (5), said cog-like element (6) exhibiting such a shape as to be positionable in said region (50) in order to replace the missing part of the cogging (D) of the belt (1), with said tubular prominence (5) conformed and exhibiting dimensions such as to engage and cross the through-hole (4) in order to project from the housing (3) and insert in the seating (21) of the portion (29) of the base (28) of the abutting element (2) for fastening thereof to the belt (1); and,
 wherein the portion (29) of the base (28) of the abutting element (2) positionable in the housing (3) exhibits at least a through-hole (22), externally accessible, coaxial and communicating with the seating and also coaxial with said tubular prominence (5) inserted in the through-hole (4), wherein the tubular prominence (5) is internally hollow and a fastening element (23) is insertable in said through-hole and conformed such as to insert and engage in the tubular prominence (5) in order to stabilize the fastening of the abutting element (2) to the belt (1).

2. The conveyor of claim 1, wherein the tubular prominence (5) is internally threaded and wherein the fastening element (23) is constituted by a screw.

3. The conveyor of claim 1, wherein the portion (29) of the base (28) of the abutting element (2) inferiorly projects from the base (28) and exhibits a reinforcing broadening (25) having a shape and dimensions such as to interest at least a part of the surface of the abutting element (2) which is opposite with respect to the article abutting surface.

4. The conveyor of claim 3, wherein the surface of the abutting element (2) interested by said broadening (25) exhibits at least a recess (24) at the through-hole (22) for facilitating insertion of the fastening element (23).

5. A conveyor for transferring articles, comprising:
 a cogged belt (1) provided with a first surface (10) exhibiting a cogging (D) for ring-winding on corresponding activating pulleys, and a second surface (11) opposite said first surface (10);
 at least one abutting element (2) fixable to said belt (1) for abutting an article and transferring the article following activation of the belt (1) by the pulleys;
 wherein the belt (1) exhibits a housing (3) in said second surface (11) and wherein said abutting element (2) exhibits a base (28) which is provided with a portion (29) conformed such as to be insertable and positionable in said housing (3) in order to enable fastening thereof to the belt (1);
 wherein the belt (1) exhibits at least a through-hole (4) at the housing (3) and wherein said portion (29) of the base (28) of the abutting element (2) affords at least a seating (21) in such a position that when inserted and positioned in the housing (3) said seating (21) is facing and coaxial to said through-hole (4) and further comprising a fastener (5, 6), insertable through the through-hole (4) and positionable in the seating (21) for fastening the abutting element (2) to the belt (1);
 wherein the belt (1) is missing a part of the cogging (D) thereof in a region (50) of the first surface (10) thereof, situated at the housing (3), and wherein the fastener (5, 6) consist of an element (6) conformed as a cog-like element (6) bearing at least a tubular prominence (5), said cog-like element (6) exhibiting such a shape as to be positionable in said region (50) in order to replace the missing part of the cogging (D) of the belt (1), with said tubular prominence (5) conformed and exhibiting dimensions such as to engage and cross the through-hole (4) in order to project from the housing (3) and insert in the seating (21) of the portion (29) of the base (28) of the abutting element (2) for fastening thereof to the belt (1); and, wherein the cog-like element (6) inferiorly exhibits a sliding skate (9), solidly constrained thereto, which is slidably insertable internally of a guide when the cog-like element (6) is in the lower branch of the cogged belt (1).

* * * * *